United States Patent [19]
Nonogaki et al.

[11] Patent Number: 4,815,821
[45] Date of Patent: Mar. 28, 1989

[54] FACE PLATE FOR DISPLAY

[75] Inventors: Saburo Nonogaki; Hajime Morishita, both of Tokyo; Nobuaki Hayashi, Saitama; Shoichi Uchino, Hachioji; Yoshifumi Tomita, Mobara; Masahiro Nishizawa, Mobara; Kiyoshi Miura, Mobara, all of Japan

[73] Assignee: Hitachi, Ltd., Tokyo, Japan

[21] Appl. No.: 87,259

[22] Filed: Aug. 20, 1987

[30] Foreign Application Priority Data

Aug. 29, 1986 [JP] Japan .................. 61-201386

[51] Int. Cl.$^4$ ........................... G02B 1/10; H04N 9/16
[52] U.S. Cl. ........................................ 350/164; 358/64
[58] Field of Search ............................ 350/164; 358/64

[56] References Cited

U.S. PATENT DOCUMENTS 3,349,170 10/1967 Von Felgel-Farnholz ......... 350/164

FOREIGN PATENT DOCUMENTS 2428252 2/1975 Fed. Rep. of Germany .

OTHER PUBLICATIONS

Kohashi et al, "Water-Soluble, Reciprocity-Law-Failing Photoresist Composed of Poly(acrylamide-co-D-iacetone Acrylamide) and Water-Soluble Bisazide", Photographic Science & Eng., vol. 23, No. 3, May/Jun. 1979.

Haisma, J., "Wide-Spectrum Tint Free Reflection Reduction of Viewing Screens", Applied Optics, vol. 24, No. 16, 15 Aug. '85, pp. 2679-2686.

Primary Examiner—Bruce Y. Arnold
Attorney, Agent, or Firm—Antonelli, Terry & Wands

[57] ABSTRACT

A light-transmitting layer is formed on a transparent glass panel, the light-transmitting layer having a larger refractive index than that of the glass panel, and a light-absorbing layer having a light-transmitting region is formed on the light-transmitting layer. The light reflected from the interface of the glass panel and the light-absorbing layer is effectively attenuated by the light-transmitting layer, so that it is possible to obtain an excellent image having a considerably strong contrast.

16 Claims, 1 Drawing Sheet

FIG. 1 PRIOR ART
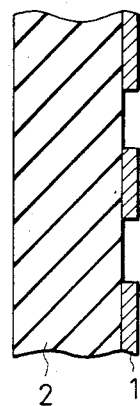
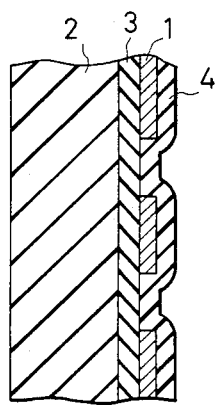
FIG. 2
FIG. 3
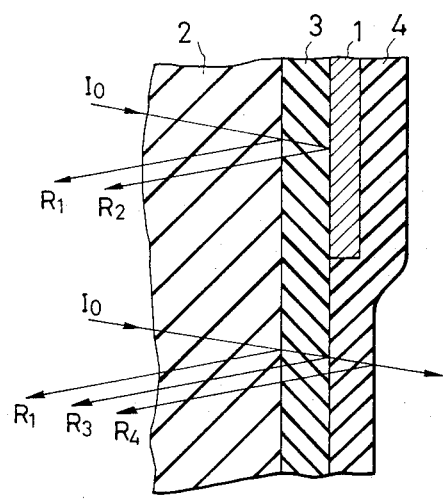

FACE PLATE FOR DISPLAY

BACKGROUND OF THE INVENTION

The present invention relates to a face plate for a display. More particularly, the present invention pertains to a face plate of low reflecting properties which is suitably used for a high-contrast fluorescent screen.

In the process for producing a fluorescent screen for a color cathode-ray tube, it has heretofore been common practice to form a light-absorbing layer (black matrix) having light-transmitting portions (apertures) on the inner surface of the screen portion of a cathode-ray tube before the step of coating a fluorescent material for the purpose of shielding undesirable fluorescence generated due to offset of electron beam striking positions to thereby prevent lowering of the color purity and for the purpose of reducing the reflection of external light at the surface of the cathode-ray tube to thereby increase the contrast of the luminous image on the screen, as described in Japanese Patent Publication No. 20225/1977 which corresponds to West German Pat. No. 2428252.

External observation of the screen portion of a conventional color cathode-ray tube finds that there is substantially no irregular reflection from the black matrix but the specular reflection therefrom is stronger than that from a glass surface. The above-described prior art does not take into consideration the specular reflection from the black matrix and therefore suffers from the problem that the virtual image of a certain object which is present around the viewer may be formed at the rear of the screen to obstruct the viewing or to hinder the contrast of the luminous image from improving as expected.

SUMMARY OF THE INVENTION

It is a primary object of the present invention to provide a substrate which enables said specular reflection to be lowered considerably, thereby overcoming the above-described problems of the prior art.

To this end, according to the present invention, a light-transmitting layer which has a higher refractive index than that of glass is provided between a light-absorbing layer defining a black matrix and a glass face plate.

BRIEF DESCRIPTION OF THE INVENTION

FIG. 1 shows the cross-sectional structure of an essential part of the face plate of a conventional black matrix color picture tube;

FIG. 2 is a fragmentary sectional view of one embodiment of the present invention; and FIG. 3 is a schematic view employed to describe the principle of the present invention.

DETAILED DESCRIPTION OF THE PREFERRED EMBODIMENTS

In a typical conventional color cathode-ray tube, a light-absorbing (opaque) layer 1 which defines a black matrix is formed directly on the inner surface of a glass face plate (panel) 2 as shown in FIG. 1. On the other hand, in the present invention, a light-transmitting layer 3 which has a larger refractive index than that of the glass face plate 2 is provided between the black matrix light-absorbing layer 1 and the glass face plate 2 as shown in FIG. 2. A second light-transmitting layer 4 which has a smaller refractive index than that of the light-transmitting layer 3 may be formed in such a manner that the layer 4 covers both the light-absorbing layer 1 and the light-transmitting layer 3 as shown in FIG. 2.

The present invention makes good use of the phenomenon that a light-absorbing layer (a colloidal carbon coating in almost all cases) which defines a black matrix reflects light as if it were a transparent dielectric having a high refractive index.

FIG. 3 is a schematic view employed to describe the principle of reduction in reflectivity in accordance with the present invention. Referring to FIG. 3, incident light $I_0$ which enters from the outside is reflected at the interface of the glass face plate 2 and the light-transmitting layer 3 having a relatively high refractive index and also at the interface of the light-transmitting layer 3 and the light-absorbing layer 1 to produce reflected rays $R_1$ and $R_2$, respectively. At this time, if the thickness of the light-transmitting layer 3 having a relatively high refractive index is equal to a quarter of the wavelength of light therein, the phases of the reflected rays $R_1$ and $R_2$ are opposite to each other. Therefore, these two reflected rays $R_1$ and $R_2$ act so as to weaken each other. Accordingly, if the intensities of the two reflected rays are equal to each other, the sum total of the intensities thereof is zero.

FIGS. 2 and 3 show a face plate which is further provided with a second light-transmitting layer 3 having a relatively low refractive index. According to the present invention, it is possible to obtain much better effects than those in the prior art merely by providing the first light-transmitting layer 3 having a relatively high refractive index between the glass substrate 2 and the light-absorbing layer 1. However, it is possible to obtain even more excellent effects by additionally providing the second light-transmitting layer 4 having a relatively low refractive index so as to form a structure such as that shown in FIGS. 2 and 3. The second light-transmitting layer 4 serves to form a multilayer structure of low reflecting properties in combination with the first light-transmitting layer 4 to thereby lower the reflectivity of the light-transmitting portions of the black matrix (apertures through the black matrix, where no light-absorbing layer 1 is present). If the thickness of the first light-transmitting layer 3 is equal to a quarter of the wavelength of the light therein and the thickness of the second light-transmitting layer 4 is also equal to a quarter of the wavelength of the light therein and if the amplitude intensity of the reflected ray $R_3$ is equal to the sum total of the intensities of the reflected rays $R_1$ and $R_4$, the sum total of the intensities of all the reflected rays is zero. Conditions which must be satisfied in order to achieve the above-described reflectionless state are the same as those for antireflection coatings which are applied to optical parts such as lenses.

Multiple reflection is ignored in the above description for the purpose of facilitating understanding. If multiple reflection is taken into consideration, the conditions for attaining the reflectionless state must be somewhat modified. Said conditions are valid only with respect to light having a specific wavelength. Accordingly, it is impossible to form a structure which is completely non-reflective with respect to all light within the visible region. However, it is possible according to the present invention to considerably lower the reflectivity of the blank matrix over a wide wavelength range in the same way as in the case of antireflection coatings for optical parts.

Embodiments of the present invention will be described hereinunder with reference to the accompanying drawings. FIG. 2 is a sectional view of one embodiment of the face plate for a display according to the present invention, and FIG. 3 is a view employed to describe the principle of the embodiment. Referring to FIG. 2, a titanium oxide layer serving as the first light-transmitting layer 3 with a relatively high refractive index was formed on a transparent substrate 2 defined by a glass plate, and a colloidal carbon layer serving as the light-absorbing layer 1 defining a black matrix was formed on the titanium oxide layer. Thereafter, in this embodiment a silicon oxide layer serving as the second light-transmitting layer 4 with a relatively low refractive index was formed. The above-described layer structure was formed in accordance with a series of steps described below.

First step (formation of titanium oxide layer):

A transparent substrate 2 defined by a glass plate (6×6 cm) was spin-coated with a colloidal aqueous solution of titanium oxide, and the coating was then dried by means of infrared heating to form a light-transmitting layer 3 having a relatively high refractive index. The rotational speed of the spin coating was 200 revolutions per minute. The thickness of the layer formed as described above was found to be 70 nm as the result of measurement carried out using a feeder-type film thickness measuring device. The colloidal aqueous solution of titanium oxide was prepared by dropping 1 part by volume of titanium tetrachloride into 100 parts by volume of ice-cooled water, and before the coating, a small amount (0.025 % by weight) of polyvinyl alcohol (Poval 224; manufactured by Kuraray Co., Ltd.) was added to the solution.

Second step (formation of colloidal carbon layer):

Next, a colloidal carbon layer 1 having holes in the shape of a matrix of dots was formed on the titanium oxide layer 3 in accordance with a method which is essentially the same as an ordinary method of producing a black matrix for a color cathode-ray tube (e.g., the method described in the specification of Japanese Pat. Publication No. 20225/1977). More specifically, a water-soluble negative photoresist was coated all over the titanium oxide film 3 formed on the inner surface of the glass plate 2 and then exposed to light in the shape of dots through a shadow mask. Thereafter, development was carried out to form a photoresist form in the shape of dots, and after colloidal carbon had been coated all over the surface, the dot-shaped photoresist film, together with the colloidal carbon thereon, was removed with a photoresist stripping liquid. Thus, the colloidal carbon layer 1 having a thickness of 425 nm and provided with holes in a matrix of dots was formed on the titanium layer 3. The proportion of the total area of the lighttransmitting portions, i.e., dot-like holes, with respect to the overall area of the colloidal carbon layer 1 was 38%.

Third step (formation of silicon oxide layer):

Finally, a silicon oxide dispersion was spin-coated on the light-absorbing layer 1 defined by the colloidal carbon layer and then dried by means of infrared heating to form a second light-transmitting layer 4 having a relatively low refractive index. The rotational speed of the spin coating was 180 revolutions per minute. The measured value of the thickness of the layer 4 thus formed was 125 nm. The silicon oxide coating solution was prepared by adding a small amount (0.05%) of polyvinyl alcohol (Poval 224; manufactured by Kuraray Co., Ltd.) and a trace amount of a surface-active agent (Emulgen 810; manufactured by Kao Atlas Co., Ltd.) to a solution prepared by diluting Ludox HS-40 (manufactured by Dupon) 40 times.

As a comparative sample, a conventional face plate for a display such as that shown in FIG. 1 was prepared by applying only the above-described second step to a transparent glass substrate 2 (6×6 cm). Then, the macroscopic light reflectivity (the incident and reflecting directions of light were as shown in FIG. 3) at the layer-covered side of each of the face plates which were respectively produced through all the steps, i.e., the first, second and third steps, and through the second step only was measured using a spectrophotometer. As a result, it was found that, when the wavelength of light was 550nm and the incident and reflecting angles were 5°, the reflectivity of the face plate produced through all the steps was 1.8%, whereas the comparative face plate was 4.9%. Although the face plate for a display according to the present invention is provided with the light-transmitting layer 4 having a relatively low refractive index, the light transmitting layer 4 serves to suppress reflection at the portions of the light-absorbing layer 1 where no colloidal carbon is coated and the layer 4 has no effect on the colloidal carbon coated portions of the layer 1. Accordingly, it is clear that the specular reflection at the light-absorbing layer 1 was reduced by the provision of the light-transmitting layer 3 having a relatively high refractive index.

The present invention may be carried out in various modifications, and the films may be formed using a variety of methods. For example, vacuum evaporation and sputtering may be applied to the formation of the light-transmitting layer having a relatively high refractive index or the light-transmitting layer having a relatively low refractive index. Further, the first step which has been explained in the above-described embodiment may be executed during the second step, that is between the development of the photoresist and the application of carbon. By doing so, the light-transmitting layer 3 having a relatively high refractive index is selectively formed only in the area between the carbon layer (light-absorbing layer) 1 and the glass substrate 2, and no light-transmitting layer 3 is formed in the portions (holes) where no carbon layer 1 is formed. Accordingly, it is possible to form a black matrix of low reflecting properties without the need to carry out the third step.

As has been described above, the present invention provides a face plate for a display wherein a light-absorbing layer partially having a light-transmitting portion is formed on a transparent substrate, which is characterized in that at least one transparent dielectric layer is formed between the light-absorbing layer and the transparent substrate and the refractive index of the transparent dielectric layer with respect to visible light is set so as to be larger than the refractive index of the transparent substrate. Thus, it is possible to lower the light reflectivity of the black matrix of a color cathode-ray tube by a large margin, so that the contrast of the output image is greatly improved.

It should be noted that the application of the present invention is not necessarily limited to the fluorescent screens of color cathode-ray tubes but the invention is also effective in reducing the reflection of external light to improve the contrast of the output image in display devices which utilize gaseous discharge or liquid crystal.

It is a matter of course that the vacant portions of the light-absorbing layer 1 are respectively provided with luminescent display material layers, for example, red, green and blue fluorescent layers in the case of a color picture tube, in the face plate structure shown in FIGS. 1 to 3 although such fluorescent layers are not illustrated because they are not directly related to the present invention.

In the present invention, the refractive index of the first light-transmitting layer 3 having a relatively high refractive index is preferably selected so as to fall within the range from about 1.7 to 2.0 inclusive. A refractive index less than 1.7 results in $R_1 < < R_2$, whereas a refractive index in excess of 2.0 results in $R_1 < < R_2$, unfavorably.

Similarly, the refractive index of the second light-transmitting layer 4 having a relatively low refractive index is preferably selected so as to fall within the range from about 1.3 to 1.5 inclusive. A refractive index less than 1.3 results in an extremely low mechanical strength of the material, whereas a refractive index in excess of 1.5 results in $R_1 + R_3 < < R_4$, and therefore favorable effects cannot be obtained in both cases.

Although in the above-described embodiment silicon dioxide and titanium oxide are employed as materials for the first and second light-transmitting layers, respectively, these materials are not necessarily limitative, but it is possible to employ any material for each of the layers which has a refractive index within the above-described range and satisfies other conditions for materials which are used for display devices.

The thickness of each of the first and second light-transmitting films is selected so as to be substantially $\chi/4$. $\chi$ represents the wavelength of light in each of the first and second light-transmitting films and is equal to a value obtained by dividing the wavelength (about 400 to 700 nm) of visible light in vacuum by the refractive index of each of the first and second light-transmitting films. If a wavelength in the vicinity of 550 nm where the visual sensitivity is the highest is selected as the wavelength of visible light in vacuum, it is possible to obtain the most favorable effects.

What is claimed is:

1. A face plate for a display comprising:
   a transparent glass panel;
   a first light-transmitting layer formed on the surface of said glass panel and having a larger refractive index than that of said glass panel; and
   an opaque layer formed so as to be stacked on said first light-transmitting layer and having apertures therein to form a light-transmitting region.

2. A face plate for a display according to claim 1, wherein said first light-transmitting layer is formed on the whole surface of said glass panel.

3. A face plate for a display according to claim 1, wherein said first light-transmitting layer is selectively formed so as to extend only under said opaque layer.

4. A face plate for a display according to claim 1, further comprising:
   a second light-transmitting layer formed over the opaque layer and in said apertures, said second light-transmitting layer having a smaller refractive index than that of said first light-transmitting layer.

5. A face plate for a display according to claim 1, wherein the refractive index of said first light-transmitting layer is between about 1.7 and 2.0 inclusive.

6. A face plate for a display according to claim 1, wherein said first light-transmitting layer is a silicon oxide film.

7. A face plate for a display according to claim 1, wherein the refractive index of said second light-transmitting layer is between about 1.3 and 1.5 inclusive.

8. A face plate for a display according to claim 4, wherein said second light-transmitting layer is a titanium oxide film.

9. A face plate for a display according to claim 1, wherein the film thickness of said first light-transmitting layer is substantially equal to $\chi/4$ (wherein $\chi$ represents the wavelength of visible light in said first light-transmitting layer).

10. A face plate for a display according to claim 4, wherein the film thickness of said second light-transmitting layer is substantially equal to $\chi/4$ (wherein $\chi$ represents the wavelength of visible light in said second light-transmitting layer).

11. A face plate for a display according to claim 1, wherein said opaque layer is a black matrix of a color picture tube.

12. A face plate for a display according to claim 11, wherein a fluorescent layer is formed within the light-transmitting region of said black matrix.

13. A face plate for a display according to claim 4, wherein the first light-transmitting layer is formed on the whole surface of the face plate, and the second light-transmitting layer is formed so as to cover the opaque layer and cover the first light-transmitting layer exposed in the apertures of the opaque layer.

14. A face plate for a display according to claim 13, wherein the second light-transmitting film is formed in contact with the first light-transmitting layer exposed in the apertures of the opaque layer.

15. A face plate for a display according to claim 11, wherein said black matrix is made of carbon.

16. A face plate for a display according to claim 1, wherein said opaque layer is made of carbon.

* * * * *